E. RIPLEY.
Tea Kettle.

No. 31,035. Patented Jan'y 1, 1861.

WITNESSES:
J. G. Savage
N. S. Vedder.

INVENTOR.
Ezra Ripley.

UNITED STATES PATENT OFFICE.

EZRA RIPLEY, OF TROY, NEW YORK.

MODE OF HANGING COVERS TO BAILED METALLIC HOLLOW WARE.

Specification forming part of Letters Patent No. 31,035, dated January 1, 1861; Reissued December 5, 1865, No. 2,122.

*To all whom it may concern:*

Be it known that I, EZRA RIPLEY, of Troy, in the county of Rensselaer and State of New York, have invented a certain new and useful Improvement in the Manner of Constructing the Covers of Tea-Kettles or Spouted and Bailed Metallic Hollow Ware; and I do hereby declare that the following is a full, clear, and exact description of the same, reference being had to the annexed drawings, forming part of this specification, in which—

Figure 1:
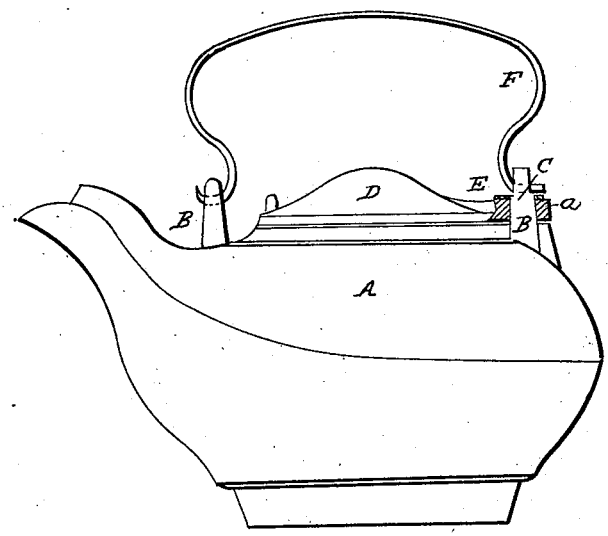
Figure 2:
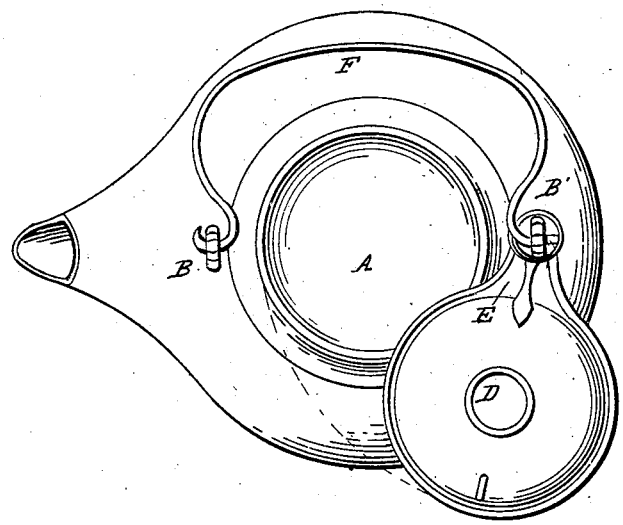

Figure 1 is a side elevation of a kettle, and Fig. 2 a top view of the same, showing my method of hanging the covers of metallic hollow-ware.

The same letters have reference to like parts in both figures.

Tea kettle covers as ordinarily constructed and applied to cast metallic tea kettles now in common use for culinary purposes, are defective in point of convenience and perfect safety to those persons handling or using such kettles, as, in the act of pouring hot water from the same, the old cover in ordinary use, is apt to fall off from and uncover the kettle allowing steam to issue therefrom, which scalds the hand holding the kettle. This defect in the ordinary cover, is regarded by all persons using tea kettles for culinary purposes, as exceedingly inconvenient and annoying, as sometimes causing severe scalds on the hand.

To obviate or remedy these defects in the old tea kettle cover, is the object of my improvement.

I so construct tea kettle covers, that when in use on the kettle, they cannot fall off and expose the hand to the scalding steam which would issue therefrom, when hot water or other hot steaming liquids are poured from the kettle spout; and the cover, if off the kettle, or unclosed when about to pour from the spout, is made self closing over the kettle by means of its own weight, in connection with arranging its point of attachment to the kettle in a line with the spout and bail of the kettle, in the manner substantially as hereinafter shown and described.

By the use of the above described improved tea kettle cover, a person in the act of pouring hot steaming liquids from the kettle spout, is effectually shielded from all danger of scalds or burns by steam on the hand holding the kettle, even when the kettle is held by an incautious person, thus rendering the self closing, nonfalling off cover, a most desirable improvement in tea kettle covers, for all persons engaged in culinary operations.

The description of my improvement is as follows, viz:

(A) is a swing, or set bailed handle tea kettle, having the handle lugs or ears (B,) and (B'); the lug (B') has formed upon its lower part, a bearing or journal (C). The cover (D), is constructed with a neck (E), having an eye $a$ by means of which the cover is attached to the lug (B'), so as to form a center bearing, upon which center the cover may be swung off to either side of the kettle when desiring to uncover the same, as seen in Fig. 2.

F is a swing bail handle, having its bearing ends inserted into the eyes of the kettle lugs or ears; but the lug (B') has its eye drilled in such a relative position to a washer of the cover, or the cover alone, so that the bearing end of the bail when inserted into the eye, shall keep the kettle cover in proper position on the lug (B'), that it may operate as described.

$b$ is a stop formed on the inside of the cover, and projecting below the upper edge of the kettle, for the purpose of limiting the extreme swing of the cover, and confining it to its range of effectual duty.

Having described my improvement in tea kettle covers, I wish to be understood, as not claiming exclusively or broadly, the covers or the use of covers of metallic hollow ware of any description in present known use, or the exclusive use of covers made to swing horizontally or vertically. Nor, do I claim swinging covers as applied to baskets, or willow ware, or boxes. Nor, do I claim the hinging or hanging of covers to metallic hollow ware. Nor do I claim to have produced a new article of tea kettle. Neither is there an entire new use or result in operating tea kettle covers; but only, as the result of an improved cover, a more safe and convenient use to the person handling the kettle covered with it.

Therefore, what I claim as new, and desire to secure by Letters Patent, is:

An improved and more convenient article of tea kettle cover, substantially the same as herein fully described and shown, and such as may be attached in a line with the spout, to spouted and bailed metallic hollow ware or tea kettles, in the manner substantially as herein shown and set forth.

EZRA RIPLEY.

Witnesses:
J. J. SAVAGE,
N. S. VEDDER.